(12) United States Patent
Matsui

(10) Patent No.: US 12,497,477 B2
(45) Date of Patent: Dec. 16, 2025

(54) PHOTOCURABLE COMPOSITION, SEALING AGENT, AND CURED PRODUCT

(71) Applicant: THREEBOND CO., LTD., Tokyo (JP)

(72) Inventor: Chiaki Matsui, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 632 days.

(21) Appl. No.: 17/995,988

(22) PCT Filed: Apr. 14, 2021

(86) PCT No.: PCT/JP2021/015386
§ 371 (c)(1),
(2) Date: Oct. 12, 2022

(87) PCT Pub. No.: WO2021/210598
PCT Pub. Date: Oct. 21, 2021

(65) Prior Publication Data
US 2023/0257502 A1     Aug. 17, 2023

(30) Foreign Application Priority Data

Apr. 16, 2020  (JP) ................. 2020-073243

(51) Int. Cl.
| C08F 2/46 | (2006.01) |
| C08F 2/50 | (2006.01) |
| C08F 290/04 | (2006.01) |
| C08G 61/04 | (2006.01) |
| C08K 3/36 | (2006.01) |

(52) U.S. Cl.
CPC ............ C08F 290/042 (2013.01); C08K 3/36 (2013.01)

(58) Field of Classification Search
CPC .... C09D 151/003; C09D 151/08; C09K 3/10; C08F 290/042; C08F 290/067; C08F 220/1812; C08F 220/281; C08F 220/286; C08K 3/36; G11B 33/12; Y02P 20/141
USPC .......... 522/77, 74, 71, 1, 6, 189, 184; 520/1
See application file for complete search history.

(56) References Cited

U.S. PATENT DOCUMENTS

| 2008/0088969 A1 | 4/2008 | Uefune et al. |
| 2015/0005453 A1 | 1/2015 | Sridhar et al. |
| 2015/0368388 A1 | 12/2015 | Kurata et al. |
| 2018/0226664 A1* | 8/2018 | Soga ................. H01M 8/0286 |
| 2018/0241056 A1 | 8/2018 | Soga et al. |
| 2025/0092267 A1* | 3/2025 | Matsui ................... C08L 23/22 |

FOREIGN PATENT DOCUMENTS

| CN | 103555188 A | 2/2014 | |
| JP | 2008-090886 A | 4/2008 | |
| JP | 2013-216782 A | 10/2013 | |
| JP | 2014-148650 A | 8/2014 | |
| JP | 2015-514858 A | 5/2015 | |
| JP | 2017-226785 A | 12/2017 | |
| JP | 2021-075044 A | 5/2021 | |
| WO | 2014119340 A1 | 8/2014 | |
| WO | WO-2017029978 A1 * | 2/2017 | ............... C08F 8/00 |

OTHER PUBLICATIONS

Soga et al (WO 2017029978 Machine Translation, Feb. 23, 2017 (Year: 2017).*
Notice of Reasons for Refusal, dated Mar. 5, 2025, issued for the corresponding Japanese Patent Application No. 2022-515406, 6 pages, with English Translation.
International Search Report for the corresponding Patent Application No. PCT/JP2021/015386 dated Jun. 29, 2021, with English translation.
Office Action, dated Apr. 3, 2025, issued for the corresponding Chinese Patent Application No. 202180024724.8, 12 pages, with English translation.
Office Action, dated Jul. 25, 2025, which was issued for the corresponding Malaysian Patent Application No. PI2022005463, 5 pages.
Office Action, dated Aug. 21, 2025, which was issued for the corresponding Chinese Patent Application No. 202180024724.8, 10 pages, with English translation.

* cited by examiner

*Primary Examiner* — Jessica Whiteley
(74) *Attorney, Agent, or Firm* — LUCAS & MERCANTI, LLP

(57) ABSTRACT

A photocurable composition contains components (A) to (D). The composition contains 1 to 50 parts by mass of the following component (B) and 50 to 300 parts by mass of the component (C) relative to 100 parts by mass of the following component (A). The component (A) is a polyisobutylene having a (meth)acryloyl group in its molecule. The component (B) is a urethane-modified (meth)acrylate oligomer (excluding the component (A)). The component (C) is a (meth)acrylate monomer (excluding the component (A) and the component (B)). The component (D) is a photoinitiator.

12 Claims, 1 Drawing Sheet

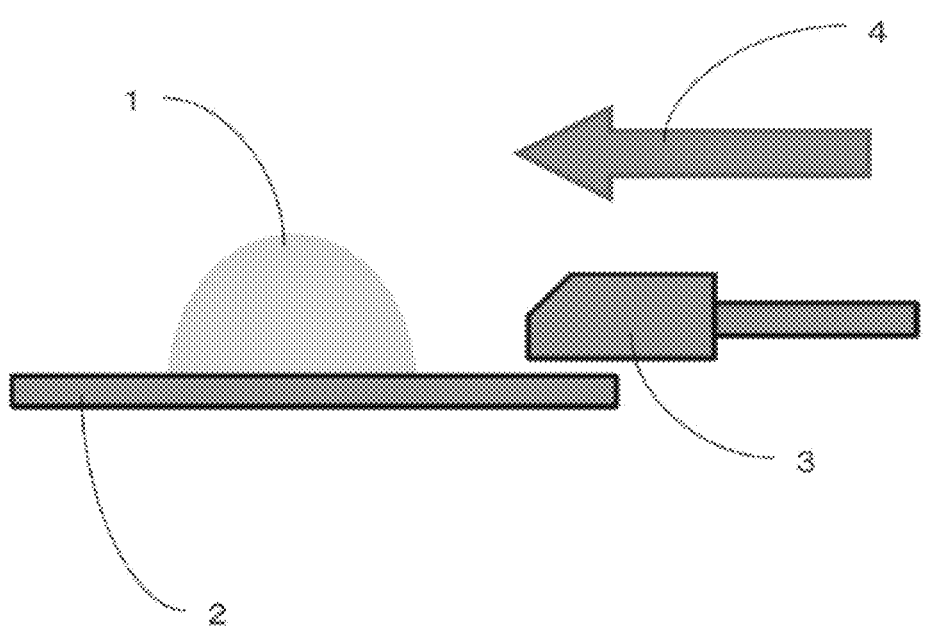

PHOTOCURABLE COMPOSITION, SEALING AGENT, AND CURED PRODUCT

CROSS REFERENCE TO RELATED APPLICATION

This Application is a 371 of PCT/JP2021/015386 filed on Apr. 14, 2021 which, in turn, claimed the priority of Japanese Patent Application No. 2020-073243 filed on Apr. 16, 2020, both applications are incorporated herein by reference.

TECHNICAL FIELD

The present invention relates to a photocurable composition containing a (meth)acrylate compound having a polyisobutylene skeleton.

BACKGROUND ART

In the field of hard disk drives, it is known that there occurs a problem that an air turbulence (turbulent flow) occurs due to high-speed rotation of a disk or the like, and vibration occurs in the disk or magnetic head. Therefore, in order to avoid such a problem, for example, a technique of enclosing helium in a housing as disclosed in JP 2008-090886 A (corresponding to US 2008/0088969 A) has been widely used. However, there has been a problem that helium leaks out in sealing with a polymer. In response to such a problem, JP 2014-148650 A (corresponding to US 2015/0368388 A) proposes a technique related to a sealing agent with a good moisture barrier property. However, such sealing agent has a problem of a low barrier property against helium and a low adhesive strength to an adherend.

SUMMARY OF INVENTION

Technical Problem

As described above, according to conventional techniques, it is difficult for a sealing agent having photocurability to maintain a good adhesive strength to an adherend while obtaining good barrier properties against both moisture and helium.

Therefore, an object of the present invention is to provide a photocurable composition that is excellent in barrier properties against both moisture and helium and can maintain a good adhesive strength to an adherend. Furthermore, another object of the present invention is to provide a sealing agent using the photocurable composition and a cured product obtained by curing the photocurable composition.

Solution to Problem

As a result of intensive studies to achieve the above objects, the present inventors have found that a photocurable composition to be described in detail below has excellent barrier properties against both moisture and helium and can maintain a good adhesive strength to an adherend, and have completed the present invention.

The gist of the present invention will be described below. The first embodiment of the present invention is a photocurable composition including components (A) to (D) below, and containing 1 to 50 parts by mass of the following component (B) and 50 to 300 parts by mass of the following component (C) relative to 100 parts by mass of the following component (A);

component (A): a polyisobutylene having a (meth)acryloyl group in its molecule
component (B): a urethane-modified (meth)acrylate oligomer (excluding the component (A))
component (C): a (meth)acrylate monomer (excluding the component (A) and the component (B))
component (D): photoinitiator.

The second embodiment of the present invention is the photocurable composition according to the first embodiment, containing 10 to 30 parts by mass of the component (B) relative to 100 parts by mass of the component (A).

The third embodiment of the present invention is the photocurable composition according to the first or second embodiment, containing 100 to 200 parts by mass of the component (C) relative to 100 parts by mass of the component (A).

The fourth embodiment of the present invention is the photocurable composition according to any one of the first to third embodiments, in which the component (A) contains a polyisobutylene having an aromatic hydrocarbon group in its molecule.

The fifth embodiment of the present invention is the photocurable composition according to any one of the first to fourth embodiments, in which the component (C) contains a (meth)acrylate monomer having a structure of formula (C-1) to be described later.

The sixth embodiment of the present invention is the photocurable composition according to any one of the first to fifth embodiments, further containing a filler as component (E), in which the photocurable composition contains 0.1 to 50 parts by mass of the component (E) relative to 100 parts by mass of the component (A).

The seventh embodiment of the present invention is the photocurable composition according to any one of the first to sixth embodiments, in which the component (B) is a urethane-modified (meth)acrylate oligomer not containing a rubber skeleton.

The eighth embodiment of the present invention is a sealing agent containing the photocurable composition according to any one of the first to seventh embodiments.

The ninth embodiment of the present invention is the sealing agent according to the eighth embodiment, in which the sealing agent is used in a hard disk drive.

The tenth embodiment of the present invention is a cured product obtained by curing the photocurable composition according to any one of the first to seventh embodiments by light irradiation.

BRIEF DESCRIPTION OF DRAWINGS

FIG. 1 is a diagram schematically illustrating a method for measuring an adhesive strength. In FIG. 1, 1 represents a bead; 2 represents an adherend; 3 represents a contactor (digital force gauge is omitted); and 4 represents a traveling direction of the contactor.

DESCRIPTION OF EMBODIMENTS

Hereinafter, embodiments of the present invention will be described. Note that the present disclosure is not limited only to the following embodiments.

In the present description, "X to Y" indicating a range means a range including a lower limit value (X) and an upper limit value (Y), the concentration and % respectively represent mass concentration and % by mass, unless otherwise specified, and the ratio is a mass ratio unless otherwise specified. Furthermore, unless otherwise specified, operations and measurements of physical properties and the like were performed under conditions of a room temperature (20 to 25° C.)/a relative humidity 40 to 50% RH, but the conditions are not limited thereto. Moreover, "A and/or B" includes each of A and B and all combinations of one or more, and specifically means at least one of A and B, and means A, B as well as combinations of A and B.

[Photocurable Composition]

A photocurable composition (hereinafter, also referred to as a "photocurable composition" or simply "composition") according to one embodiment of the present invention is a photocurable composition containing the following components (A) to (D), and containing 1 to 50 parts by mass of the following component (B) and 50 to 300 parts by mass of the following component (C) relative to 100 parts by mass of the following component (A):

component (A): a polyisobutylene having a (meth)acryloyl group in its molecule
component (B): a urethane-modified (meth)acrylate oligomer (excluding the component (A))
component (C): a (meth)acrylate monomer (excluding the component (A) and the component (B))
component (D): photoinitiator.

The photocurable composition according to one embodiment of the present invention is excellent in barrier properties against both moisture and helium, and can maintain good adhesive strength to an adherend. Specifically, the photocurable composition according to one embodiment of the present invention not only has a low water vapor permeability coefficient (water vapor transmission coefficient) as a measure of moisture barrier properties and a low helium permeability coefficient (helium transmission coefficient) as a measure of helium barrier properties, but also has good adhesive strength to an adherend.

<Component (A)>

The component (A) contained in the composition according to the present invention is a polyisobutylene having one or more (meth)acryloyl groups in its molecule. The polyisobutylene refers to a polymer having a polyisobutylene skeleton containing a repeating unit represented by the following formula (A-1). Furthermore, in the present description, the "polyisobutylene skeleton containing a repeating unit represented by the following formula (A-1)" is also simply referred to as a "polyisobutylene skeleton". Moreover, in the present description, the term "(meth) acryloyl" includes both acryloyl and methacryloyl. Accordingly, for example, the term "(meth)acryloyl group" encompasses both acryloyl groups ($H_2C=CH-C(=O)-$) and methacryloyl groups ($H_2C=C(CH_3)-C(=O)-$). Also, similarly, the term "(meth)acrylic" encompasses both acrylic and methacrylic.

[Chemical Formula 1]

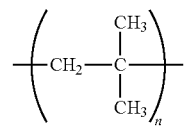

A-1

In addition, in the present description, the term "polymer" is not limited by theory, and refers to, for example, a compound having a structure with a repeating unit of a monomer in its molecule, such as a main chain, and having two or more repeating units.

The polyisobutylene as the component (A) is not particularly limited as long as it is a polymer having one or more (meth)acryloyl groups and having a polyisobutylene skeleton. Furthermore, regarding the component (A) that can be used in the present invention, a compound having a urethane bond in addition to one or more (meth)acryloyl groups and a polyisobutylene skeleton is intended to be included in the component (A) and not in the component (B).

In one preferred embodiment, the polyisobutylene as the component (A) contains the polyisobutylene skeleton as a block. Also, as one preferred embodiment, n is 2 or more in the above formula (A-1). It is presumed that the composition according to the present invention has low moisture permeability due to the polyisobutylene skeleton contained in the component (A). Here, from the viewpoint of further improving the barrier property to moisture and helium and the adhesive property, in the above formula (A-1), n is preferably 2 to 300, more preferably 10 to 150, and particularly preferably 20 to 100.

The polyisobutylene as the component (A) may contain another constituent unit other than the repeating unit represented by the formula (A-1). When polyisobutylene as the component (A) contains another constituent unit described above, a diblock body or a triblock body may be formed together with a block formed by polymerizing another constituent unit. In other words, the polyisobutylene may have a form (diblock body) further containing a block formed by polymerizing another constituent unit (a polymerizable monomer) in addition to the block formed of the repeating unit represented by the formula (A-1). In addition, the polyisobutylene may have a form (triblock body) containing two blocks formed by polymerizing another constituent unit (polymerizable monomer) in addition to the block formed of the repeating unit represented by the formula (A-1). Among them, the polyisobutylene is preferably a monoblock containing only a block formed of a repeating unit represented by the formula (A-1) without containing a block derived from another polymerizable monomer.

Here, the component (A) preferably contains a polyisobutylene having an aromatic hydrocarbon group from the viewpoint of more easily obtaining a cured product (improving curability) by introducing a rigid skeleton. By using the polyisobutylene having an aromatic hydrocarbon group, it is possible to suppress a decrease in curability due to flexibility of a polyisobutylene skeleton when curing the composition.

The above aromatic hydrocarbon group may be contained in either a main chain or a side chain in the polyisobutylene as the component (A). From the viewpoint of improving curability of the composition, the aromatic hydrocarbon group is preferably contained between the polyisobutylene skeleton and the (meth)acryloyl group.

An aromatic hydrocarbon ring contained in the aromatic hydrocarbon group is not particularly limited, and examples thereof include a benzene ring, a biphenyl ring, a naphthalene ring, a pentalene ring, an indene ring, an anthracene ring, an azulene ring, a fluorene ring, a heptalene ring, an acenaphthalene ring, a phenalene ring, a phenanthrene ring, a triphenylene ring, a pyrene ring, a chrysene ring, a picene ring, a perylene ring, a pentaphene ring, a pentacene ring, a tetraphene ring, a hexaphene ring, a hexacene ring, and the like. In consideration of availability, a benzene ring or naphthalene ring is preferable, and a benzene ring is particularly preferable. In other words, the aromatic hydrocarbon group is preferably a group derived from the above aromatic hydrocarbon ring.

From the viewpoint of further improving the curability of the composition, the polyisobutylene preferably contains a divalent aromatic hydrocarbon group. Here, as the divalent aromatic hydrocarbon group, an aromatic hydrocarbon group having 6 to 30 carbon atoms is preferable, and for example, a phenylene group, a biphenylene group, a naphthalenylene group, an anthrylene group, a fluorenylene group, a phenanthrylene group, or a pyrenylene group is preferable, a phenylene group, a biphenylene group, a naphthalenylene group, an anthrylene group, or a fluorenylene group is more preferable, and a phenylene group is particularly preferable.

Furthermore, the above aromatic hydrocarbon group may be substituted. At this time, the substituent is not particularly limited, and examples thereof include a monovalent hydrocarbon group having 1 to 20 carbon atoms, an alkoxy group having 1 to 20 carbon atoms, and the like. Examples of the monovalent hydrocarbon group having 1 to 20 carbon atoms include a methyl group, an ethyl group, a propyl group, an isopropyl group, a butyl group, a sec-butyl group, a tert-butyl group, a pentyl group, an isopentyl group, a neopentyl group, a hexyl group, an isohexyl group, a neohexyl group, a heptyl group, an octyl group, an isooctyl group, a sec-octyl group, a tert-octyl group, a 2-ethylhexyl group, a nonyl group, a decanyl group, and the like. Furthermore, examples of the alkoxy group having 1 to 20 carbon atoms include a methoxy group, an ethoxy group, a propoxy group, an isopropoxy group, a butoxy group, a sec-butoxy group, a tert-butoxy group, a pentyloxy group, an isopentyloxy group, a neopentyloxy group, a hexyloxy group, an isohexyloxy group, a neohexyloxy group, a heptyloxy group, an octyloxy group, an isooctyloxy group, a sec-octyloxy group, a tert-octyloxy group, a 2-ethylhexyloxy group, a nonyloxy group, and the like.

The polyisobutylene as the component (A) preferably contains two or more (meth)acryloyl groups in the compound, and from the viewpoint of curability, the number of (meth)acryloyl groups contained in the polyisobutylene is preferably 1 to 12, more preferably 2 to 8, still more preferably 2 to 4, and particularly preferably 2. In addition, the (meth)acryloyl group may be present at the side chain and/or the terminal of the molecule, but is preferably present at the terminal of the molecule from the viewpoint of rubber elasticity. Furthermore, from the viewpoint of curability, polyisobutylene as the component (A) preferably has one or more acryloyl groups in one molecule, more preferably has 1 to 12 acryloyl groups, also preferably has 2 to 8 acryloyl groups, still more preferably has 2 to 4 acryloyl groups, and particularly preferably has 2 acryloyl groups.

Molecular weight of polyisobutylene as the component (A) is not particularly limited, but mainly from the viewpoint of excellent adhesive property, the number average molecular weight is preferably 200 to 500,000, more preferably 500 to 400,000, still more preferably 1,000 to 100,000, and particularly preferably 3,000 to 50,000. Moreover, in the present description, the number average molecular weight and weight average molecular weight are values calculated by a standard polystyrene conversion method with the use of gel permeation chromatography (GPC).

The component (A) may be used alone or in combination of two or more. When two or more kinds are used in combination, content of the component (A) refers to the total amount.

The polyisobutylene as the component (A) may be either a commercially available product or a synthetic product. The method for manufacturing the component (A) is not limited, and the component (A) can be manufactured by a production method disclosed in JP 2013-35901 A, JP 2013-216782 A, Republication 2013-047314 (corresponding to US 2014/243444 A), WO 2017/099043 (corresponding to US 2018/362676 A) and other publications.

Specific examples of commercially available products of the component (A) include EPION (registered trademark) series EP400V manufactured by Kaneka Corporation or the like, but are not limited thereto.

Furthermore, in order to lower permeability of an inert gas such as helium, the photocurable composition according to one embodiment of the present invention preferably is substantially free of a compound having a such as polybutadiene, hydrogenated rubber skeleton polybutadiene, polyisoprene rubber, or hydrogenated polyisoprene other than the component (A). Moreover, in the present description, the phrase "substantially free of" includes an aspect in which a composition contains a target substance by contamination, but means that the target substance may be present at a ratio of equal to or less than 0.1% by mass (lower limit: 0% by mass) relative to the total amount of the composition. Also, in the present description, the term "rubber skeleton" refers to a structure contained in a rubber molecule such as the polybutadiene, the hydrogenated polybutadiene, the polyisoprene rubber, the hydrogenated polyisoprene, or a styrene copolymer thereof.

<Component (B)>

The component (B) contained in the composition according to the present invention is a urethane-modified (meth)acrylate oligomer. However, the component (A) is excluded from the component (B). The composition according to the present invention contains 1 to 50 parts by mass of the component (B) relative to 100 parts by mass of the component (A). When the content of the component (B) relative to 100 parts by mass of the component (A) is less than 1 part by mass, sealability at an interface becomes a problem when the composition is used to bond to an adherend, which is not preferable from the viewpoint of adhesive property. In other words, the adhesive strength cannot be maintained. On the other hand, when the content of the component (B) relative to 100 parts by mass of the component (A) exceeds 50 parts by mass, helium permeability increases. In addition, separation from the component (A) becomes a problem.

The urethane-modified (meth)acrylate oligomer as the component (B) is a (meth)acrylate oligomer ((meth)acryloyl group-containing oligomer) having one or more urethane bonds (—NH—C(=O)—O—). The (meth)acrylate oligomer is an oligomer having one or more (meth)acryloyl groups. Also, in the present description, the term "oligomer" refers to a substance having a weight average molecular weight of more than 1,000. The weight average molecular weight of the component (B) is preferably more than 1,000 and 200,000 or less, more preferably 5,000 to 100,000, and particularly preferably 10,000 to 50,000. Within such a range, the adhesive property can be further enhanced.

The urethane-modified (meth)acrylate oligomer as the component (B) preferably has 2 to 10 (meth)acryloyl groups, more preferably has 2 to 8 (meth)acryloyl groups, still more preferably has 2 to 4 (meth)acryloyl groups, and more preferably has 2 (meth)acryloyl groups (bifunctional (meth)acrylate oligomer) in one molecule from the viewpoint of improving the adhesive property. Also, from the same viewpoint, the component (B) is preferably an acrylate oligomer having one or more acryloyl groups in one molecule. Furthermore, from the same viewpoint, the urethane-modified (meth)acrylate oligomer as the component (B) preferably has 2 to 10 acryloyl groups, more preferably has 2 to 8 acryloyl groups, still more preferably has 2 to 4 acryloyl groups, and particularly preferably has 2 acryloyl groups (a bifunctional acrylate oligomer) in one molecule.

Examples of a main skeleton of the urethane-modified (meth)acrylate oligomer include an ester bond, an ether bond, a carbonate bond, and the like. It is known that the urethane-modified (meth)acrylate oligomers having these main skeleton are obtained by, for example, a synthesis method in which a urethane bond is formed by a reaction of a polyester polyol, a polyether polyol or a polycarbonate polyol, which forms a main skeleton, with a polyisocyanate, and an acrylic acid or a compound having a hydroxyl group and a (meth)acryloyl group is further added to an unreacted isocyanate group, or the like, but the synthesis method is not limited thereto. From the viewpoint of improving the adhesive property, the main skeleton of the urethane-modified (meth)acrylate oligomer is preferably polyester, polyether or polycarbonate, and particularly preferably polyether. In other words, from the viewpoint of improving the adhesive property, the composition according to the present invention preferably contains a urethane-modified (meth)acrylate oligomer having a polyether skeleton as the component (B), and more preferably contains a urethane-modified acrylate oligomer having a polyether skeleton.

As also one preferred embodiment, from the viewpoint of improving the barrier property against helium, the urethane-modified (meth)acrylate oligomer as the component (B) is preferably a urethane-modified (meth)acrylate oligomer not containing a rubber skeleton.

As for the urethane-modified (meth)acrylate oligomer as the component (B), either a commercially available product or a synthetic product may be used. Specific examples of commercially available products of the components (B) include AH-600, AT-600, UA-306H, and UF-8001G manufactured by Kyoeisha Chemical Co., Ltd., and the like; UN-6200, UN-6202, UN-6300, and UN-6301 manufactured by Negami Chemical Industrial Co., Ltd., and Shikoh (registered trademark) Series UV-2000B, UV-3300B, and UV-3700B manufactured by Mitsubishi Chemical Corporation, and the like, as the urethane-modified (meth)acrylate oligomer having a polyether skeleton; UN-7600, and UN-7700 manufactured by Negami Chemical Industrial Co., Ltd., and the like, as urethane-modified (meth)acrylate oligomers having a polyester skeleton; UN-9000PEP, and UN-9200A manufactured by Negami Chemical Industrial Co., Ltd., and the like, as urethane-modified (meth)acrylate oligomers having a polycarbonate skeleton; but are not limited thereto.

The composition according to the present invention contains 1 to 50 parts by mass of the component (B) relative to 100 parts by mass of the component (A). As also one preferred embodiment, the composition according to the present invention contains 10 to 30 parts by mass of the component (B) relative to 100 parts by mass of the component (A). As also one more preferred embodiment, the composition according to the present invention contains 15 to 25 parts by mass of the component (B) relative to 100 parts by mass of the component (A). In the composition according to the present invention, when the component (B) is contained in an amount of 1 part by mass or more, 10 parts by mass or more, or even 15 parts by mass or more, relative to 100 parts by mass of the component (A), good adhesive strength can be maintained. Furthermore, in the composition according to the present invention, when the component (B) is contained in an amount of 50 parts by mass or less, 30 parts by mass or less, or even 25 parts by mass or less, relative to 100 parts by mass of the component (A), separation from the component (A) can be effectively suppressed.

The component (B) may be used alone or in combination of two or more kinds thereof. Also, when two or more kinds of components (B) are contained, the total amount thereof is within the range above.

<Component (C)>

The component (C) contained in the composition according to the present invention is a (meth)acrylate monomer. However, the component (A) and the component (B) are excluded from the component (C). The composition according to the present invention contains 50 to 300 parts by mass of the component (C) relative to 100 parts by mass of the component (A). When the content of the component (C) relative to 100 parts by mass of the component (A) is less than 50 parts by mass, viscosity of the photocurable composition becomes high, which is not preferable from the viewpoint of workability. On the other hand, when the content of the component (C) relative to 100 parts by mass of the component (A) exceeds 300 parts by mass, separation from the component (A) becomes a problem.

The (meth)acrylate monomer as the component (C) is an ester monomer having one or more (meth)acryloyl groups. Molecular weight of the component (C) is not particularly limited, but in consideration of diluting the component (A) and the component (B), the molecular weight of the component (C) is preferably 1,000 or less, more preferably 500 or less, and particularly preferably 400 or less. Also, from the viewpoint of excellent compatibility with the component (A), the molecular weight of the component (C) is preferably 80 or more, more preferably 100 or more, and particularly preferably 150 or more. Molecular weight of the component (B) can be measured by a known method such as a gas chromatography-mass spectrometry (GC-MS) method. In addition, the molecular weight can be specified by specifying the structure of the component (B) by a method such as NMR and performing calculation based on the structure.

The (meth)acrylate monomer as the component (C) preferably has 1 to 3 (meth)acryloyl groups (in other words, 1 to 3 functional (meth)acrylate monomers). Furthermore, from the viewpoint of excellent compatibility with the component (A), the component (C) preferably contains a monofunctional (meth)acrylate monomer, and more preferably contains a monofunctional acrylate monomer.

Specific examples of the monofunctional (meth)acrylate monomer as the component (C) include a (meth)acrylate having a chain structure such as a lauryl (meth)acrylate, an isononyl (meth)acrylate, an isooctyl (meth)acrylate, a stearyl (meth)acrylate, a 2-ethylhexyl (meth)acrylate, an ethyl carbitol (meth)acrylate, a methoxydiethylene glycol (meth)acrylate, an ethoxydiethylene glycol (meth)acrylate, a butoxyethyl (meth)acrylate, a butoxytriethylene glycol (meth)acrylate, a 2-ethylhexylpolyethylene glycol (meth) acrylate, a methoxydipropylene glycol (meth)acrylate, a 2-hydroxyethyl (meth)acrylate, a 2-hydroxypropyl (meth) acrylate, a glycerol (meth)acrylate, a polyethylene glycol (meth)acrylate, a polypropylene glycol (meth)acrylate, an ethylene oxide-modified succinic acid (meth)acrylate, a caprolactone-modified 2-hydroxyethyl (meth)acrylate, a N,N-dimethylaminoethyl (meth)acrylate, and a N,N-diethylaminoethyl (meth)acrylate; a (meth)acrylate having an alicyclic structure such as cyclohexyl (meth)acrylate, a dicyclopentanyl (meth)acrylate, and an isobornyl (meth) arylate; a (meth)acrylate having an aromatic ring structure such as a benzyl (meth)acrylate, a phenyl (meth)acrylate, a phenoxyethyl (meth)acrylate, a phenoxydiethylene glycol (meth)acrylate, a phenoxytetraethylene glycol (meth)acrylate, a nonylphenoxyethyl (meth)acrylate, a nonylphenoxytetraethylene glycol (meth)acrylate, a nonylphenylpolypropylene glycol (meth)acrylate, a nonylphenol EO-modified (meth)acrylate (n≈1), and an ethylene oxide-modified phthalic acid (meth)acrylate; a (meth)acrylate having a heterocyclic ring structure such as a tetrahydrofurfuryl (meth)acrylate, a caprolactone-modified tetrahydrofurfuryl (meth)acrylate, a glycidyl (meth)acrylate, and a morpholinoethyl (meth)acrylate; an ethylene oxide-modified phosphoric acid (meth)acrylate, and the like, but are not limited thereto.

Specific examples of the bifunctional (meth)acrylate monomer as the component (C) include a (meth)acrylate having a chain structure such as a 1,3-butylene glycol di(meth)acrylate, a 1,4-butylene glycol di(meth)acrylate, a neopentyl glycol di(meth)acrylate, a 1,6-hexane glycol di(meth)acrylate, an ethylene glycol di(meth)acrylate, a polyethylene glycol di(meth)acrylate, a propylene glycol di(meth)acrylate, a tripropylene glycol di(meth)acrylate, an ethyleneoxide-modified neopentyl glycol di(meth)acrylate, a propylene oxide-modified neopentyl glycol di(meth)acrylate, a hydroxypivalinic acid ester neopentyl glycol di(meth)acrylate, a caprolactone-modified hydroxypivalinic acid ester neopentyl glycol di(meth)acrylate, a neopentyl glycol-modified trimethylolpropane di(meth)acrylate, and a stearic acid-modified pentaerythritol di(meth)acrylate; a (meth)acrylate having an alicyclic structure such as a dimethyloltricyclodecane di(meth)acrylate, a dicyclopentenyl di(meth)acrylate, or an ethylene oxide-modified dicyclopentenyl di(meth)acrylate; a (meth)acrylate having an aromatic ring structure such as a bisphenol A di(meth)acrylate, an ethylene oxide-modified bisphenol A di(meth)acrylate, or an ethylene oxide-modified bisphenol S di(meth)acrylate; a (meth)acrylate having a heterocyclic ring structure such as a dimethacryloyl isocyanurate; and the like, but are not limited thereto.

Specific examples of the trifunctional (meth)acrylate monomer as the component (C) include (meth)acrylates having a chain structure such as a trimethylolpropane tri(meth)acrylate, a pentaerythritol tri(meth)acrylate, an ethylene oxide-modified trimethylolpropane tri(meth)acrylate, and a propylene oxide-modified trimethylolpropane tri(meth)acrylate; (meth)acrylates having a heterocyclic ring structure such as a tris(methacryloyloxyethyl) isocyanurate; and the like, but are not limited thereto.

From the viewpoint of reducing the viscosity of the resulting composition and easily controlling the viscosity to a suitable range, the composition according to the present invention preferably contains, as the component (C), at least one selected from the group consisting of a 1 to 3 functional (meth)acrylate monomers having a chain structure, a 1 to 3 functional (meth)acrylate monomer having an alicyclic structure, a 1 to 3 functional (meth)acrylate monomer having an aromatic ring structure, and a 1 to 3 functional (meth)acrylate monomer having a heterocyclic ring structure. From the same viewpoint, the composition more preferably contains, as the component (C), at least one selected from the group consisting of a monofunctional (meth)acrylate monomer having a chain structure, a monofunctional (meth)acrylate monomer having an alicyclic structure, a monofunctional (meth)acrylate monomer having an aromatic ring structure, and a monofunctional (meth)acrylate monomer having a heterocyclic ring structure. Also, from the same viewpoint, the composition more preferably contains, as the component (C), at least one selected from the group consisting of a monofunctional acrylate monomer having a chain structure, a monofunctional acrylate monomer having an alicyclic structure, a monofunctional acrylate monomer having an aromatic ring structure, and a monofunctional acrylate monomer having a heterocyclic ring structure.

Furthermore, in the present description, the term "(meth)acrylate monomer having a chain structure" refers to a (meth)acrylate monomer which does not have a cyclic structure. The term "chain structure" includes a straight chain structure and a branched chain structure. Moreover, the term "(meth)acrylate monomer having an alicyclic structure" refers to a (meth)acrylate monomer having a cyclic hydrocarbon group. Examples of the alicyclic structure include monocyclic cycloalkyl groups such as a cyclopropyl group, a cyclobutyl group, a cyclopentyl group, a cyclohexyl group, a methylcyclohexyl group, and a dimethylcyclohexyl group; monocyclic cycloalkenyl groups such as a cyclobutenyl group, a cyclopentenyl group, and a cyclohexenyl group; polycyclic cycloalkyl groups such as a hydronaphthyl group, a 1-adamantyl group, a 2-adamantyl group, a norbornyl group, a methylnorbornyl group, an isobornyl group, a dicyclopentanyl group, a tricyclodecyl group, and a tetracyclododecyl group; polycyclic cycloalkenyl groups such as dicyclopentenyl group and dicyclopentenyloxyethyl group; and the like, but are not limited thereto.

Examples of a more preferable component (C) include monofunctional acrylate monomers having a chain hydrocarbon group (structure) such as an isononyl acrylate, a 2-ethylhexyl acrylate, and an isooctyl acrylate; monofunctional acrylate monomers having an alicyclic structure such as isobornyl an acrylate and a dicyclopentanyl acrylate; monofunctional (meth)acrylate monomers having an aromatic ring structure such as a nonylphenol EO-modified acrylate (n≈1) or a paracumyl phenol EO-modified acrylate (n≈1.2) represented by the following formula (C-1); monofunctional acrylate monomers having a heterocyclic ring structure as such a tetrahydrofurfuryl acrylate; but are not limited thereto.

[Chemical Formula 2]

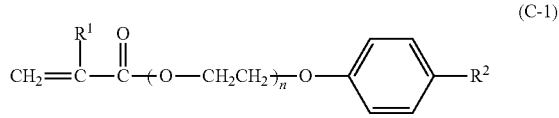

(C-1)

(In the above formula (C-1), $R^1$ represents a hydrogen or a methyl group, $R^2$ represents a hydrocarbon group having 1 to 20 carbon atoms, and n represents an integer of 0 to 10.)

In the above formula (C-1), $R^1$ is preferably a hydrogen. Also, $R^2$ is preferably a hydrocarbon group having 5 to 10 carbon atoms. Examples of the hydrocarbon group as $R^2$ include saturated hydrocarbon groups such as a methyl group, an ethyl group, a propyl group, an isopropyl group, a butyl group, a pentyl group, a hexyl group, a heptyl group, an octyl group, a nonyl group, an isononyl group, a decyl group, an undecyl group, a dodecyl group (lauryl group), a tridecyl group, a tetradecyl group, a pentadecyl group, a hexadecyl group, a heptadecyl group, and an octadecyl group (stearyl group); unsaturated hydrocarbon groups such as a vinyl group, a 1-propenyl group, an allyl group, a 1-butenyl group, a 3-butenyl group, an isoprenyl group, a pentenyl group, a hexenyl group, a heptenyl group, an octenyl group, a nonenyl group, and a decenyl group; aromatic hydrocarbon groups such as a phenyl group, a naphthyl group, a biphenyl group, and a fluorenyl group. Furthermore, these substituents may be further substituted by one or more arbitrary substituents different from each other. However, the arbitrary substituents above do not substitute the same kind of substituents. For example, the arbitrary substituent substituting an aromatic hydrocarbon group does not include an aromatic hydrocarbon group. Among them, $R^2$ is preferably a saturated hydrocarbon group having 5 to 10 carbon atoms.

As one preferred embodiment, the composition according to the present invention contains, as the component (C), at least one selected from the group consisting of an isononyl acrylate, a 2-ethylhexyl acrylate, and an isooctyl acrylate; an isobornyl acrylate, a dicyclopentanyl acrylate; a nonylphenol EO-modified acrylate (n≈1) and a paracumyl phenol EO-modified acrylate (n≈1.2) represented by the above formula (C-1); and a tetrahydrofurfuryl acrylate. As one more preferred embodiment, the composition according to the present invention contains, as the component (C), at least one selected from the group consisting of an isononyl acrylate, a 2-ethylhexyl acrylate, and an isooctyl acrylate; an isobornyl acrylate, a dicyclopentanyl acrylate; a nonylphenol EO-modified acrylate (n≈1) and a paracumyl phenol EO-modified acrylate (n≈1.2) represented by the above formula (C-1); and contains a tetrahydrofurfuryl acrylate. By adopting such embodiment, it is possible to exhibit good barrier properties to both moisture and helium. As one particularly preferred embodiment, the composition according to the present invention contains, as the component (C), a nonylphenol EO-modified acrylate (n≈1) represented by the above formula (C-1) and a tetrahydrofurfuryl acrylate. By adopting such embodiment, the barrier property against helium is particularly improved.

Furthermore, from the viewpoint of reducing outgassing from the cured product, the component (C) preferably contains a (meth)acrylate monomer represented by the above formula (C-1). From the same viewpoint, the component (C) more preferably contains an acrylate monomer ($R^1$ is hydrogen) represented by the above formula (C-1). More preferred embodiments of $R^1$ and n in the (meth)acrylate monomer represented by the above formula (C-1) are as described above.

As for the (meth)acrylate monomer as the component (C), either a commercially available product or a synthetic product may be used. Examples of specific product names of commercially available products of the components (C) include INAA and IBXA manufactured by Osaka Organic Chemical Industry Ltd.; SR440 manufactured by Arkema K.K.; 2-ethylhexyl acrylate manufactured by Mitsubishi Chemical Corporation; Aronix (registered trademark) M-111, M-110, 2-ethylhexyl acrylate manufactured by Toagosei Co., Ltd.; Fancryl (registered trademark) FA-513AS manufactured by Showa Denko Materials Co., Ltd., and the like, but are not limited thereto.

The composition according to the present invention contains 50 to 300 parts by mass of the component (C) relative to 100 parts by mass of the component (A). As also one preferred embodiment, the composition according to the present invention contains 100 to 200 parts by mass of the component (C) relative to 100 parts by mass of the component (A). As also one more preferred embodiment, the composition according to the present invention contains 130 to 180 parts by mass of the component (C) relative to 100 parts by mass of the component (A). When the component (C) is contained in an amount of 50 parts by mass or more, 100 parts by mass or more, or even 130 parts by mass or more relative to 100 parts by mass of the component (A) in the composition according to the present invention, the viscosity of the photocurable composition can be reduced. Furthermore, in the composition according to the present invention, when the component (C) is contained in an amount of 300 parts by mass or less, 200 parts by mass or less, or even 180 parts by mass or less relative to 100 parts by mass of the component (A), separation from the component (A) can be effectively suppressed.

The component (C) may be used alone or in combination of two or more kinds thereof. Also, when two or more kinds of components (C) are contained, the total amount thereof is within the range above.

<Component (D)>

The component (D) contained in the composition according to the present invention is a photoinitiator (photopolymerization initiator). The photoinitiator is a compound (photoradical polymerization initiator) which generates radical species when the photoinitiator is decomposed by irradiation with light, and is used for radically polymerizing the components (A) to (C).

Examples of the photoinitiator include, as the component (D), a dimethoxyacetophenone, a 1-hydroxycyclohexyl phenyl ketone, a diethoxyacetophenone, an acetophenone, a propiophenone, a benzophenone, a xanthol, a fluorene, a benzaldehyde, an anthraquinone, a triphenylamine, a 2,2-dimethoxy-1,2-diphenylethane-1-one, a carbazole, a 2-hydroxy-2 methylphenylpropane-1-one, a 1-[4-(2-hydroxyethoxy)phenyl]-2 hydroxy-2 methyl-1 propane-1-one, a 2-hydroxy-1-{4-[4-(2-hydroxy-2 methylpropionyl)benzyl]phenyl}-2 methylpropane-1-one, a 2-benzyl-2 dimethylamino-1-(4-morpholinophenyl)-1 butanone, a bis(2,4,6-trimethylbenzoyl)phenylphosphine oxide, a 2,4,6-trimethylbenzoyldiphenylphosphine oxide, a 3-methylacetophenone, a 4-methylacetophenone, a 3-pentylacetophenone, a 4-methoxyacetophenone, a 3-bromoacetophenone, a p-diacetylbenzene, a 3-methoxybenzophenone, a 4-allylacetophenone, a 4-methylbenzophenone, a 4-chloro-4 benzylbenzophenone, a 3-chloroxanthone, a 3,9-dichloroxanthone, a 3-chloro-8-nonylxanthone, a benzoyl, a benzoin methyl ether, a benzoin butyl ether, a bis(4-dimethylaminophenyl) ketone, a benzyl methoxyketal, a 2-chlorothioxanthone, and the like; oligomeric/polymeric photoinitiators such as a 2-hydroxy-2 methyl-1-[4-(1-methylvinyl)phenyl]propanoneoligomer, polymers of a 2-hydroxy-2 methyl-1-[4-(1-methylvinyl)phenyl]propanone (n=2 to 10), but are not limited thereto.

Among them, from the viewpoint of reducing outgassing from the cured product, the component (D) preferably contains an oligomer/polymer type photoinitiator.

As for the photoinitiator as the component (D), either a commercially available product or a synthetic product may be used. Specific examples of commercially available products of the component (D) include, but are not limited to, an oligomer type polymerization initiator (oligomer/polymer type photoinitiator) in which α-hydroxy propiophenone is bonded to a side chain, represented by ESACURE (registered trademark) KIP-150 manufactured by IGM Resins B.V., and the like.

The composition according to the present invention preferably contains 0.1 to 10 parts by mass of the component (D) relative to 100 parts by mass of the component (A). As also one preferred embodiment, the composition according to the present invention contains 1.0 to 5.0 parts by mass of the component (D) relative to 100 parts by mass of the component (A). As also one more preferred embodiment, the composition according to the present invention contains more than 3.0 parts by mass and less than 5.0 parts by mass of the component (D) relative to 100 parts by mass of the component (A). In the composition according to the present invention, when the component (D) is contained in an amount of 0.1 parts by mass or more, 1.0 parts by mass or more, or even more than 3.0 parts by mass relative to 100 parts by mass of the component (A), an optimum handleability is exhibited. Furthermore, in the composition according to the present invention, when the component (D) is contained in an amount of 10 parts by mass or less, 5.0 parts by mass, or even less than 5.0 parts by mass relative to 100 parts by mass of the component (A), a good curability can be maintained.

The component (D) may be used alone or in combination of two or more kinds thereof. Also, when two or more kinds of components (D) are contained, it is preferable that the total amount thereof is within the range above.

<Component (E)>

The composition according to the present invention preferably further contains a filler as the component (E) in addition to the components (A) to (D) above. For the filler as the component (E), those known in the present technical field can be used, and among them, the filler is preferably an amorphous silica in which silanol groups remain on the surface. In other words, the filler as the component (E) is preferably an amorphous silica having a silanol group on its surface. Furthermore, the amorphous silica is preferably a hydrophilic silica powder (particles) having an average primary particle size of 1 to 100 nm and a specific surface area by a BET method of 10 to 300 $m^2/g$. Moreover, the amorphous silica is more preferably a hydrophilic silica powder (particles) having an average primary particle size of 5 to 30 nm and a specific surface area by a BET method of 150 to 250 $m^2/g$. Also in the present description, as the average primary particle size, a value measured from a scanning electron microscope image of a measurement target using image analysis software or the like is adopted. Specifically, a statistically reliable predetermined number of particles (for example, 100 particles per field of view×10 planes or more for a total of 1000 particles or more) are observed, and particle images are extracted using an analysis software to calculate a particle size.

Although silanol groups remain on its surface of the amorphous silica after manufacturing, there are compounds in which side chains are added to silanol groups by various surface treatments. However, in the present invention, the amorphous silica (that is, non-surface-modified amorphous silica) in which silanol groups remain on its surface is suitable as the component (E). According to such embodiment, outgassing due to residual surface treatment agent is suppressed. Furthermore, according to the above embodiment, by combining the component (E) with the components (A) to (C), the component (E) can contribute to compatibility and stabilization of a lower viscosity and a higher structural viscosity ratio. In particular, the component (A) is less polar or non-polar, while the non-surface-modified amorphous silica has a polarity. Accordingly, the use of the non-surface-modified amorphous silica as a filler is also preferred in that the component (A) and the filler are hardly compatible with each other and suitable thixotropy can be imparted to the resulting composition.

As for the filler as the component (E), either a commercially available product or a synthetic product may be used. Specific examples of commercially available products of the component (E) include, but are not limited to, AEROSIL (registered trademark) series OX50, 50, 90G, 130, 150, 200, 300, and 380 manufactured by Nippon Aerosil Co., Ltd., and the like.

When the composition according to the present invention contains the component (E), the composition preferably contains 0.1 to 50 parts by mass of the component (E) relative to 100 parts by mass of the component (A). As also one preferred embodiment, the composition according to the present invention contains 1 to 30 parts by mass of the component (E) relative to 100 parts by mass of the component (A). As also one more preferred embodiment, the composition according to the present invention contains 5 to 25 parts by mass of the component (E) relative to 100 parts by mass of the component (A). As the most preferred embodiment, the composition according to the present invention contains 15 parts by mass or more and less than 25 parts by mass of the component (E) relative to 100 parts by mass of the component (A). In the composition according to the present invention, when the component (E) is contained in an amount of 0.1 parts by mass or more, 1 part by mass or more, 5 parts by mass or more, or even 15 parts by mass or more, relative to 100 parts by mass of the component (A), a high structural viscosity ratio can be maintained. Furthermore, in the composition according to the present invention, when the component (E) is contained in an amount of 50 parts by mass or less, 30 parts by mass or less, 25 parts by mass or less, or even less than 25 parts by mass relative to 100 parts by mass of the component (A), a handleability is improved, which is preferable.

The component (E) may be used alone or in combination of two or more kinds thereof. Also, when two or more kinds of components (E) are contained, it is preferable that the total amount thereof is within the range above.

<Organic Peroxide>

The photocurable composition according to the present invention may further contain an organic peroxide in addition to the above components (A) to (D) as long as the properties of the present invention are not impaired. During light irradiation, a shaded portion that is not irradiated with light may remain as an uncured portion. However, when the composition contains an organic peroxide, the above uncured portion is easily cured by heating, which is preferable. Specific examples of the organic peroxide include ketone peroxides such as a methyl ethyl ketone peroxide, a cyclohexanone peroxide, a 3,3,5-trimethylcyclohexanone peroxide, a methylcyclohexanone peroxide, an a methylacetoacetate peroxide, and acetylacetone peroxide; peroxyketals such as a 1,1-bis(t-butylperoxy)-3,3,5-trimethylcyclohexane, a 1,1-bis(t-butylperoxy)cyclohexane, a 2,2-bis(t-butylperoxy) octane, a n-butyl-4,4-bis(t-butylperoxy) valerate, and a 2,2-bis(t-butylperoxy)butane; hydroperoxides such as a t-butyl hydroperoxide, a cumene hydroperoxide, a diisopropylbenzene hydroperoxide, a p-menthane hydroperoxide, a 2,5-dimethylhexane-2,5-dihydroperoxide, and a 1,1,3,3-tetramethylbutyl hydroperoxide; dialkyl peroxides such as a di-t-butyl peroxide, a t-butylcumyl peroxide, a dicumyl peroxide, a $\alpha,\alpha'$-bis(t-butylperoxy-m-isopropyl)benzene, a 2,5-dimethyl-2,5-di(t-butylperoxy)hexane, and a 2,5-dimethyl-2,5-di(t-butylperoxy)hexyne-3; diacyl peroxides such as an acetyl peroxide, an isobutyryl peroxide, an octanoyl peroxide, a decanoyl peroxide, a lauroyl peroxide, a 3,5,5-trimethylhexanoyl peroxide, a succinic acid peroxide, a benzoyl peroxide, a 2,4-dichlorobenzoyl peroxide, and an m-toluoyl peroxide; peroxydicarbonates such as a diisopropylperoxydicarbonate, a di-2-ethylhexylperoxydicarbonate, a di-n-propylperoxydicarbonate, a bis-(4-t-butylcyclohexyl) peroxydicarbonate, a dimyristyl peroxydicarbonate, a di-2-ethoxyethylperoxydicarbonate, a dimethoxyisopropylperoxydicarbonate, a di(3-methyl-3-methoxybutyl) peroxydicarbonate, and a diallyl peroxydicarbonate; peroxyesters such as a t-butylperoxyacetate, a t-butylperoxyisobutyrate, a t-butylperoxypivalate, a t-butylperoxyneodecanoate, a cumylperoxyneodecanoate, a t-butylperoxy-2-ethylhexanoate, a t-butylperoxy-3,5,5-trimethylhexanoate, a t-butylperoxylaurate, a t-butylperoxybenzoate, a di-t-butylperoxyisophthalate, a 2,5-dimethyl-2,5-di(benzoylperoxy)hexane, a t-butylperoxymaleic acid, a t-butylperoxyisopropyl carbonate, a cumylperoxyoctoate, a t-hexylperoxyneodecanoate, a t-hexylperoxypivalate, a t-butylperoxyneohexanoate, a t-hexylperoxyneohexanoate, a cumylperoxyneohexanoate; and an acetylcyclohexylsulfonyl peroxide, a t-butylperoxyallyl carbonate, and the like, but are not limited thereto.

Content of the organic peroxide is not particularly limited, and those skilled in the art can appropriately set the content as long as the properties of the present invention are not impaired. Furthermore, the organic peroxides may be used alone or in combination of two or more kinds thereof.

<Plasticizer>

The photocurable composition according to the present invention may contain a non-reactive plasticizer in addition to the above components (A) to (D) as long as the properties of the present invention are not impaired. Here, the term "non-reactive" means that the component (A), the component (B), and the component (C) of the present invention do not react with each other to be polymerized.

Specific examples of the non-reactive plasticizers include an aromatic polycarboxylic acid ester as a polycarboxylic acid-based ester plasticizer; a dioctyl phthalate (DOP), a dibutyl phthalate (DBP), a diheptyl phthalate (DHP), a diisononyl phthalate (DINP), a diisodecyl phthalate (DIDP), a butyl benzyl phthalate (BBP) and the like, as a phthalic acid ester-based plasticizer; a trioctyl trimellitate (TOTM) and a triisodecyl trimellitate (TITM) and the like, as a trimellitic acid ester-based plasticizer; a tetraoctyl pyromellitate and the like, as a pyromellitic acid ester-based plasticizer; a di-2-ethylhexyl adipate (DOA), an isodecyl adipate (DIDA), a di-2-ethylhexyl sebacate (DOS), a dibutyl sebacate (DBS), a di-2-ethylhexyl maleate (DOM), a dibutyl fumarate (DBF), a di-2-ethylhexyl azelate (DOZ), a di-2-ethylhexyl epoxyhexahydrophthalate, a trioctyl citrate, and a glycerol triacetate and the like, as an aliphatic polycarboxylic acid ester-based plasticizers; a trimethyl phosphate, a tributyl phosphate, a tri-(2-ethylhexyl) phosphate, a tributoxyethyl phosphate, a triphenyl phosphate, a tricresyl phosphate, an alkylaryl phosphate, a triethyl phosphate, a tri(chloroethyl) phosphate, a tris dichloropropyl phosphate, a tris(β-chloropropyl) phosphate, an octyl diphenyl phosphate, a tris(isopropylphenyl) phosphate, a cresyl phenyl phosphate and the like, as a phosphoric acid ester-based plasticizer; and the like, but are not limited thereto. Furthermore, these may be used alone or in combination of two or more kinds thereof.

Elastomers can also be used as the non-reactive plasticizers. Such plasticizer is preferably an elastomer that is solid or liquid at 25° C., but is preferably an elastomer that is liquid at 25° C. in consideration of the handleability. Specific examples of the non-reactive elastomer include rubber-based elastomers such as a polybutadiene, a hydrogenated polybutadiene, a polyisoprene, a hydrogenated polybutadiene, a polybutene, a polyisobutylene, copolymers of these monomers, diblock polymers thereof, and triblock polymers thereof. Examples of a block polymer include, but are not limited to, a polystyrene-polyisobutylene diblock copolymer, a polystyrene-polyisobutylene-polystyrene triblock copolymer, and the like. The component is preferably compatible with the components (A) to (C). These may be used alone or in combination of two or more kinds thereof. Also, in order to further lower the permeability of an inert gas such as helium in the composition according to the present invention, it is preferable to use at least one selected from the group consisting of a polycarboxylic acid ester-based plasticizer, a trimellitic acid ester-pyromellitic acid ester-based based plasticizer, a plasticizer, an aliphatic polycarboxylic acid ester-based plasticizer, and a phosphoric acid ester-based plasticizer, instead of using the above rubber-based elastomer plasticizer as the plasticizer.

Content of the plasticizer is not particularly limited, and those skilled in the art can appropriately set the content as long as the properties of the present invention are not impaired.

<Optional Component>

The photocurable composition according to the present invention may further contain components other than the above components (A) to (D) as long as the properties of the present invention are not impaired. Examples of such component include colorants such as pigments and dyes; inorganic fillers such as a metal powder, a calcium carbonate, a talc, an alumina, an aluminum hydroxide (however, the inorganic filler does not contain the above component (E)); organic fillers such as a polystyrene filler, a polyurethane filler, a poly (meth)acrylic filler, and a rubber filler (however, the organic filler does not contain the above component (A) and the above component (B)); a plasticizer; a flame retardant; an antioxidant; a polymerization inhibitor; an antifoaming agent; a coupling agent; a leveling agent; a rheology control agent; and the like. By adding other component as mentioned above, a composition excellent in resin strength, adhesive strength, workability, storability, and the like, and a cured product thereof can be obtained. The content of the above components is not particularly limited, and those skilled in the art can appropriately set the content as long as the properties of the present invention are not impaired.

Furthermore, the photocurable composition according to the present invention may contain other monomers in addition to the above components (A) to (D) as long as the properties of the present invention are not impaired. Examples of such monomers include an acrylic acid and a methacrylic acid; (meth)acrylamide compounds such as a (meth)acrylamide, an N-methyl (meth)acrylamide, an N-ethyl (meth)acrylamide, an N-propyl (meth)acrylamide, an N-isopropyl (meth)acrylamide, an N-n-butyl (meth)acrylamide, an N-tert-butyl (meth)acrylamide, an N-butoxymethyl (meth)acrylamide, an N-methylol (meth)aacrylamide, an N,N-dimethyl (meth)acrylamide, a 4-(meth)acryloyl morpholine, an N,N-diethyl(meth)acrylamide, an N-methyl-N-ethyl (meth)acrylamide, and an N-hydroxyethyl (meth)acrylamide; and the like.

<Composition Ratio>

In the composition according to the present invention, the content of each of the components above is preferably in the following range from the viewpoint of improving the barrier properties to both moisture and helium and maintaining good adhesive strength to an adherend. In other words, the composition according to the present invention preferably contains the component (B) in an amount of 10 to 30 parts by mass, more preferably 15 to 25 parts by mass, relative to 100 parts by mass of the component (A); it is preferable to contain 100 to 200 parts by mass of the component (C), and it is more preferable to contain 130 to 180 parts by mass of the component (C), relative to 100 parts by mass of the component (A); it is preferable to contain 1.0 to 5.0 parts by mass of the component (D), and it is more preferable to contain more than 3.0 parts by mass and less than 5.0 parts by mass of the component (D), relative to 100 parts by mass of the component (A) (however, when two or more components are contained in each of the components (A) to (D), the total amount thereof falls within the range above).

Furthermore, when the composition contains the component (E), the content of the component (E) is preferably 0.1 to 50 parts by mass, more preferably 1 to 30 parts by mass, still more preferably 5 to 25 parts by mass, and particularly preferably 15 parts by mass or more and less than 25 parts by mass, relative to 100 parts by mass of the component (A) (however, when the component (E) contains two or more kinds, the total amount thereof falls within the range above).

<Viscosity>

The viscosity (measurement temperature: 25° C., shear rate: 20 s$^{-1}$) of the composition according to the present invention is not particularly limited, but is preferably 3 to 40 Pa·s, more preferably 3 to 35 Pa·s, and still more preferably 5 to 30 Pa·s from the viewpoint of workability and the like. Also, when the viscosity at a shear rate of 20 s$^{-1}$ is defined as viscosity 1 and the viscosity at a shear rate of 2 s$^{-1}$ is defined as viscosity 2, the value of viscosity 2/viscosity 1 (structural viscosity ratio) is also not particularly limited, but is preferably 3.0 to 6.0, more preferably 3.5 or more and less than 5.5, and still more preferably 4.0 to 5.4. In addition, unless otherwise specified, in the present description, the value of viscosity is a value obtained by measuring viscosity at 25° C. using a cone-plate viscometer.

<Manufacturing Method>

The method for manufacturing the composition according to the present invention is not particularly limited, and the composition can be manufactured by a conventionally known method. For example, it can be manufactured by weighing predetermined amounts of the components (A) to (D) and mixing them using a mixing means such as a stirrer. Temperature and mixing time during mixing are not particularly limited, but it is preferable to mix at 10 to 70° C. for 0.1 to 5 hours. In addition, it is preferable to perform vacuum defoaming during mixing.

[Cured Product]

Another embodiment of the present invention relates to a cured product obtained by curing the above photocurable composition by light irradiation. The cured product according to one embodiment of the present invention is preferably obtained by irradiating the above photocurable composition with an active energy ray such as an ultraviolet ray to cure the photocurable composition. More specifically, the cured product according to one embodiment of the present invention is preferably obtained by applying the above photocurable composition to an adherend, and then irradiating the applied composition with an active energy ray.

<Coating Method>

The method for applying the photocurable composition according to the present invention to an adherend is not particularly limited. For example, methods such as dispensing using an automatic coater, spraying, inkjet, screen printing, gravure printing, dipping, and spin coating can be used.

<Curing Method>

The photocurable composition according to the present invention can be cured by irradiation with an active energy ray (for example, light such as ultraviolet light and visible light). The light source used at this time is not particularly limited, and a known light source can be used, and examples thereof include a low-pressure mercury lamp, a high-pressure mercury lamp, an ultra-high pressure mercury lamp, a black light lamp, a sodium lamp, a halogen lamp, a xenon lamp, an LED, and the like.

As an apparatus for curing the composition according to the present invention by irradiation with an active energy ray (light irradiation), an irradiation apparatus having the above light source (high-pressure mercury lamp, LED, or the like using an active energy ray such as ultraviolet light or visible light as a light source) can be used. Specific examples of the apparatus include a belt conveyor type irradiator, a spot irradiator, and the like, but are not limited thereto. Furthermore, the lower limit of integrated light amount is not particularly limited, but is preferably 20 KJ/m$^2$ or more, and more preferably 30 KJ/m$^2$ or more. Moreover, the upper limit of the integrated light amount is also not particularly limited, but is preferably 80 KJ/m$^2$ or less, and more preferably 70 kJ/m$^2$ or less.

[Application]

As described above, the photocurable composition according to the present invention is excellent in barrier properties to both moisture and helium, and can maintain a good adhesive strength to an adherend. Therefore, the photocurable composition according to the present invention can be suitably used for the application of a cover seal of a hard disk drive. In other words, as still another embodiment of the present invention, a sealing agent containing the above photocurable composition is provided. Furthermore, one preferred embodiment of the sealing agent is used for a hard disk drive.

The sealing agent containing the composition according to the present invention can exhibit the excellent properties above. The sealing agent of the hard disk drive can prevent an inert gas such as helium in the housing from leaking to the external environment and further prevent moisture from entering from the external environment by strictly managing the shape and size. By eliminating variations in the shape and size, leakage and intrusion from the portion can be effectively prevented.

EXAMPLES

Next, the present invention will be described in more detail with reference to examples, but the present invention is not limited only to the examples. Hereinafter, the photocurable composition may also be simply referred to as a composition.

Examples 1 to 5 and Comparative Examples 1 to 11

In order to prepare the composition, the following components were prepared;

component (A): a polyisobutylene having a (meth)acryloyl group in its molecule

Polyisobutylene having an acryloyl group at each of both terminals of a molecular chain and an aromatic hydrocarbon group (EPION (registered trademark) EP400V manufactured by KANEKA CORPORATION; it is described as "EP400V" in Table 1)

component (A'): a polybutene elastomer (not containing a (meth)acryloyl group)

Polybutene having number average molecular weight of 930 (PB950 manufactured by Daelim Industrial Co., Ltd.; it is described as "PB950" in Table 1)

Polybutene having number average molecular weight of 400 (PB400 manufactured by Daelim Industrial Co., Ltd.; it is described as "PB400" in Table 1)

component (B): a urethane-modified (meth)acrylate oligomer (excluding the component (A))

UV-curable urethane acrylate having a polyether main skeleton (Shikoh (registered trademark) UV-3700B manufactured by Mitsubishi Chemical Corporation; in Table 1, it is described as "UV-3700B"; weight average molecular weight: 38000: number of acryloyl groups: 2)

Hydrogenated polybutadiene acrylate resin having (meth)acryloyl groups at both terminals of hydrogenated polybutadiene via urethane bonds (TEAI-1000 manufactured by Nippon Soda Co., Ltd.; in Table 1, it is described as "TEAI-1000")

component (C): a (meth)acrylate monomer (excluding the component (A) and the component (B))

Isobornyl acrylate (IBXA manufactured by Osaka Organic Chemical Industry Ltd.; in Table 1, it is described as "IBXA")

Tetrahydrofurfuryl acrylate (THF-A manufactured by Kyoeisha Chemical Co., Ltd.; in Table 1, it is described as "THF-A")

Isononyl acrylate (INAA manufactured by Osaka Organic Chemical Industry Ltd.; in Table 1, it is described as "INAA")

Nonylphenol EO-modified acrylate (n≈1) (ARONIX (registered trademark) M-111 manufactured by Toagosei Co., Ltd.; in Table 1, it is described as "M-111")

Paracumyl phenol EO-modified acrylate (n≈1.2) (ARONIX (registered trademark) M-110 manufactured by Toagosei Co., Ltd.; in Table 1, it is described as "M-110")

component (D): photoinitiator.

Oligomer of 2-hydroxy-2-methyl-1-[4-(1-methylvinyl)phenyl]propanone (ESACURE (registered trademark) KIP-150 manufactured by IGM Resins B.V.; in Table 1, it is described as "KIP-150")

component (E): filler

Average primary particle size: 12 nm, specific surface area (BET method): 200 $m^2/g$ of hydrophilic silica (AEROSIL (registered trademark) 200 manufactured by Nippon Aerosil Co., Ltd.; in Table 1, it is described as "200").

The components (A) to (E) above were weighed and put into a stirrer. Thereafter, the mixture was stirred at room temperature for 1 hour using a stirrer while being subjected to vacuum defoaming. The content of each component in the composition is in accordance with Table 1, and all numerical values represent parts by mass.

TABLE 1

| Component | Material | Example 1 | Example 2 | Example 3 | Example 4 | Example 5 | Comparative Example 1 | Comparative Example 2 | Comparative Example 3 |
|---|---|---|---|---|---|---|---|---|---|
| Component(A) | EP400V | 100 | 100 | 100 | 100 | 100 | | 100 | 100 |
| Component(A') | PB950 | | | | | | | | |
| | PB400 | | | | | | | | |
| Component(B) | UV-3700B | 19 | 19 | 19 | 19 | 19 | 100 | | |
| | TEAI-1000 | | | | | | | | |
| Component(C) | IBXA | | | | | | | | |
| | THF-A | 25 | 16 | 8 | 8 | 25 | 13 | | |
| | INAA | 62 | 70 | 78 | 62 | 62 | 113 | 48 | 33 |
| | M-111 | 68 | 68 | 68 | 85 | 68 | | 18 | 33 |
| | M-110 | | | | | | 338 | | |
| Component(D) | KIP-150 | 4 | 4 | 4 | 4 | 4 | 8 | 3 | 3 |
| Component(E) | 200 | 18 | 18 | 18 | 18 | 22 | 31 | 10 | 10 |
| Total | | 296 | 296 | 296 | 296 | 300 | 603 | 178 | 178 |
| Subtotal of component (A) | | 100 | 100 | 100 | 100 | 100 | 0 | 100 | 100 |
| Subtotal of component (B) | | 19 | 19 | 19 | 19 | 19 | 100 | 0 | 0 |
| Subtotal of component (C) | | 155 | 155 | 155 | 155 | 155 | 463 | 66 | 66 |
| Subtotal of component (E) | | 18 | 18 | 18 | 18 | 22 | 31 | 10 | 10 |

| Component | Material | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|
| Component(A) | EP400V | 100 | 100 | 100 | 100 | 100 | | | |
| Component(A') | PB950 | | | | | | 100 | 100 | |
| | PB400 | | | | | | | | 100 |
| Component(B) | UV-3700B | | | | 82 | 888 | 355 | 355 | 355 |
| | TEAI-1000 | 238 | 238 | 129 | 118 | | | | |
| Component(C) | IBXA | 238 | 238 | 129 | 118 | | | | |
| | THF-A | | | | 35 | 113 | 45 | 45 | 45 |
| | INAA | 276 | 417 | 171 | 153 | 1000 | 400 | 400 | 400 |
| | M-111 | 141 | | 647 | 629 | 3000 | | 1200 | 1200 |
| | M-110 | | | | | | 1200 | | |
| Component(D) | KIP-150 | 21 | 21 | 18 | 18 | 75 | 30 | 30 | 30 |
| Component(E) | 200 | 88 | 88 | 94 | | | 110 | | |
| Total | | 1102 | 1102 | 1288 | 1253 | 5176 | 2240 | 2130 | 2130 |
| Subtotal of component (A) | | 100 | 100 | 100 | 100 | 100 | 0 | 0 | 0 |
| Subtotal of component (B) | | 238 | 238 | 129 | 200 | 888 | 355 | 355 | 355 |
| Subtotal of component (C) | | 655 | 655 | 947 | 935 | 4113 | 1645 | 1645 | 1645 |
| Subtotal of component (E) | | 88 | 88 | 94 | 0 | 0 | 110 | 0 | 0 |

The compositions of Example 1 to 5 and Comparative Example 1 to 11 were subjected to appearance confirmation (before and after curing), viscosity/structural viscosity ratio measurement, adhesive strength measurement, water vapor permeability coefficient measurement, and helium permeability coefficient measurement, and the results thereof are summarized in Table 2.

[Appearance Confirmation (Before and After Curing)]

The composition was collected at 10 g in a test tube and left to stand in a 25° C. atmosphere for 3 days in a light-shielded state. Evaluation was performed visually according to the following evaluation criteria, and the results are described in Table 2 as "appearance (before curing)". "transparent" or "clouded" is preferable. Compositions evaluated as "separated" were not otherwise evaluated, and were marked as "-" in Table 2. Thereafter, the composition in which separation was not confirmed was cured under conditions of an integrated light amount of 60 KJ/m$^2$ using a belt conveyor type ultraviolet irradiator, and visually evaluated in accordance with the following evaluation criteria, and the results are described in Table 2 as "appearance (after curing)".

<Evaluation Criteria of Appearance (Before and After Curing)>
⊙: Transparent
○: Clouded
x: Separation.

[Viscosity/Structural Viscosity Ratio Measurement]

Using a rheometer, the viscosity and the structural viscosity ratio were measured under the following conditions. HAAKE MARSIII manufactured by Thermo Fisher Scientific Inc. was used. The viscosity at a shear rate of 20 s$^{-1}$ is defined as viscosity 1, and the viscosity at a shear rate of 2 s$^{-1}$ is defined as viscosity 2. The numerical value of viscosity 1 was described as "viscosity (Pa·s)" in Table 2. The numerical value of viscosity 2/viscosity 1 was described in Table 2 as the "structural viscosity ratio". In order to discharge at an optimum pressure in bead application, the viscosity is preferably 3 to 35 Pa·s. Also, the structural viscosity ratio is preferably 3.0 to 6.0. When the structural viscosity ratio is 3.0 or more, fluidity at the time of application is suppressed, and when the structural viscosity ratio is 6.0 or less, no angled parts are generated after application.

<Measurement Conditions>
Atmospheric temperature at the time of measurement: 25° C.
Cone: C35/2 (angle 2°).

[Adhesive Strength Measurement]

The composition was applied to a plate made of SUS304 as an adherend in a bead shape having a width of 3.0±0.15 mm and a height of 2.0±0.2 mm using a dispenser. The composition was irradiated with a light using a high-pressure mercury lamp by a belt conveyor type irradiator under conditions of an integrated light amount of 60 KJ/m$^2$, and heated in a hot air drying furnace under baking conditions of 150° C.×3 hours to obtain a test piece. After baking, the test piece was allowed to stand in a room temperature environment overnight. A digital force gauge manufactured by Nippon Denso Co., Ltd. equipped with a contactor as illustrated in FIG. 1 was moved at a speed of 50 mm/minute to push the bead from right beside, and the maximum load at that time was defined as "strength (N)". The adhesive strength is preferably 10.0 N or more, more preferably 15.0 N or more. In addition, the state in which the bead peeled off from the adherend after the measurement of the adhesive strength was visually evaluated according to the following evaluation criteria, and is described as "peeled state" in Table 2. In consideration of leakage at an interface, ⊙ or ○ is preferable.

<Evaluation Criteria of Peeled State>
⊙: Overall cohesive fracture
○: Overall cohesive fracture but partial interfacial fracture
x: Overall interfacial fracture.

[Measurement of Water Vapor Permeability Coefficient (Measurement of Water Vapor Transmission Coefficient)]

A frame of 50 mm in length×50 mm in width×0.6 mm in thickness was filled with the composition, and the composition was cured by irradiating the composition with light under conditions of an integrated light amount of 30 KJ/m$^2$ using a belt conveyor type ultraviolet irradiator. The cured product was heated in a hot air drying furnace under baking conditions of 150° C.×3 hours. After the baking, the "water vapor transmission rate (g/m$^2$·24 h)" under conditions of 65° C. and 90% RH was measured with a water vapor transmission rate measuring apparatus PERMATRAN-W (registered trademark) 3/34G manufactured by Mocon Corporation. Since the water vapor transmission rate (WVTR) does not use the film thickness of the cured product in its calculation, the moisture barrier property at the same thickness cannot be evaluated. Therefore, a value obtained by considering the "film thickness (μm)" of the cured product at the time of measurement in the WVTR is regarded as a "water vapor permeability coefficient (g/m$^2$·24 h·μm)", and treated as an index of moisture permeability. From the viewpoint of reducing the moisture permeability, the water vapor permeability coefficient is preferably 50 g/m$^2$·24 h·μm or less.

[Measurement of Helium Permeability Coefficient (Measurement of Helium Transmission Coefficient)]

A gas permeability was measured by a differential pressure method according to JIS K 7126-1:2006. A frame of 50 mm in length×50 mm in width×0.6 mm in thickness was filled with the composition, and the composition was cured by irradiating the composition with light under conditions of an integrated light amount of 30 kJ/m$^2$ using a belt conveyor type ultraviolet irradiator. Helium permeability was evaluated by GTR-21A-B manufactured by GTR TEC Corporation. The "helium permeability coefficient (×10$^{-9}$) (cc·cm/cm$^2$·sec·cmHg)" determined by conversion from the "film thickness (μm) of the cured product" was measured. From the viewpoint of reducing the helium permeability, the helium permeability coefficient is preferably 8.0×10$^{-9}$ cc·cm/cm$^2$·sec·cmHg (cm$^3$·cm/cm$^2$·sec·cmHg) or less.

TABLE 2

| Items | | Example 1 | Example 2 | Example 3 | Example 4 | Example 5 | Comparative Example 1 | Comparative Example 2 | Comparative Example 3 |
|---|---|---|---|---|---|---|---|---|---|
| Appearance | Before curing | ○ | ○ | ○ | ○ | ○ | ⊙ | ○ | ○ |
| | After curing | ⊙ | ⊙ | ⊙ | ⊙ | ⊙ | ⊙ | ⊙ | ⊙ |
| | Viscosity | 13 | 14 | 10 | 15 | 30 | 10 | 57 | 57 |
| | Structural viscosity ratio | 4.1 | 4.2 | 5.3 | 4.5 | 5.2 | 6.8 | 5.5 | 5.5 |
| Adhesive strength | Strength | 19.2 | 18.3 | 18.2 | 20.4 | 16.5 | 15.5 | 8.1 | 8.6 |
| | Peeled state | ○ | ○ | ⊙ | ⊙ | ○ | ⊙ | X | X |
| Moisture | Water vapor | 42 | 41 | 41 | 40 | 40 | 110 | 25 | 20 |

TABLE 2-continued

| | | | | | | | | | |
|---|---|---|---|---|---|---|---|---|---|
| | permeability coefficient | | | | | | | | |
| | WVTR | 73 | 70 | 68 | 67 | 66 | 180 | 46 | 32 |
| | Film thickness at the time of measurement | 577 | 580 | 600 | 598 | 600 | 609 | 540 | 630 |
| Helium | Helium permeability coefficient | 6.7 | 7.4 | 7.5 | 7.0 | 6.8 | 4.7 | 7.2 | 5.5 |
| | Film thickness at the time of measurement | 592 | 604 | 616 | 592 | 625 | 635 | 640 | 490 |

| | Items | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|
| Appearance | Before curing | ○ | ○ | ⊙ | X | X | X | X | X |
| | After curing | ⊙ | ⊙ | ⊙ | — | — | — | — | — |
| | Viscosity | 16 | 17 | 16 | — | — | — | — | — |
| Structural viscosity ratio | | 8.1 | 9.3 | 6.6 | — | — | — | — | — |
| Adhesive strength | Strength | 16.9 | 16.2 | 17.1 | — | — | — | — | — |
| | Peeled state | ⊙ | ⊙ | ○ | — | — | — | — | — |
| Moisture | Water vapor permeability coefficient | 50 | 41 | 65 | — | — | — | — | — |
| | WVTR | 82 | 65 | 107 | — | — | — | — | — |
| | Film thickness at the time of measurement | 606 | 635 | 610 | — | — | — | — | — |
| Helium | Helium permeability coefficient | 9.0 | 11.0 | 8.1 | — | — | — | — | — |
| | Film thickness at the time of measurement | 627 | 713 | 619 | — | — | — | — | — |

The compositions of Examples 1 to 5 contain 1 to 50 parts by mass in total of the component (B) and 50 to 300 parts by mass in total of the component (C), relative to 100 parts by mass in total of the component (A). In these compositions, the water vapor permeability coefficient of the cured product is 50 g/m$^2$·24 h·μm or less, and the helium permeability coefficient is $8.0 \times 10^{-9}$ cc·cm/cm$^2$·sec·cmHg (cm$^3$·cm/cm$^2$·sec·cmHg) or less, and therefore the permeability of moisture and helium is maintained low. Furthermore, the strength is high, peeling does not occur at the interface with the adherend, and the sealability can be maintained. On the other hand, Comparative Example 1, which does not contain the component (A), has a low helium permeability but high moisture permeability. Comparative Examples 2 and 3, which do not contain the component (B), have low moisture and helium permeability, but the strength is low, and there is a possibility that the peeling occurs at the interface with the adherend and the sealability cannot be maintained. Comparative Examples 4 to 6 have a low moisture permeability but high helium permeability. Comparative Examples 7 to 11 contain a large amount of the component (C) relative to 100 parts by mass of the component (A). Although the cause is not clear, in Comparative Examples 7 and 8, there is a possibility that the composition was separated because a large amount of the urethane-modified (meth)acrylate oligomer not containing a rubber skeleton as the component (B) was contained, and in Comparative Examples 9 to 11, there is a possibility that the composition was separated because the component corresponding to the component (A) was a polybutene elastomer not containing a (meth)acryloyl group. When the separation of the composition occurs, it is necessary to re-stir the composition immediately before the bead application, and when the re-stirring is insufficient, unevenness occurs at the time of curing in the bead, leading to bleeding out and destabilization of sealing characteristics.

INDUSTRIAL APPLICABILITY

The photocurable composition according to the present invention has a good workability when used as a sealing agent due to its excellent viscosity and stability of the structural viscosity ratio, and the sealing agent can be efficiently formed. Also, the photocurable composition according to the present invention has a high moisture barrier property and a high helium barrier property when used as a sealing agent. Therefore, it is useful as a cover seal for sealing a housing of a hard disk drive, as well as a sealing agent for other electric and electronic components.

The present application is based on Japanese Patent Application No. 2020-073243 filed on Apr. 16, 2020, the disclosure content of which is incorporated herein by reference as a whole.

REFERENCE SIGNS LIST

1 Bead
2 Adherend
3 Contactor (digital force gauge is omitted)
4 Traveling direction of the contactor

The invention claimed is:

1. A photocurable composition comprising the following components (A) to (D), and containing 1 to 50 parts by mass of the following component (B) and 50 to 300 parts by mass of the component (C) relative to 100 parts by mass of the following component (A);
   component (A): a polyisobutylene having a (meth)acryloyl group in its molecule
   component (B): a urethane-modified (meth)acrylate oligomer that is different from the component (A)
   component (C): a (meth)acrylate monomer that is different from the component (A) and the component (B)
   component (D): a photoinitiator, wherein the photocurable composition has a structural viscosity ratio in a range from 3.0 or more to less than 5.5, the structural viscosity ratio being defined as a viscosity measured at a shear rate of 2 s$^{-1}$ divided by a viscosity measured at a shear rate of 20 s$^{-1}$, both of the viscosities being measured at 25° C. using a cone-plate viscometer.

2. The photocurable composition according to claim 1, comprising 10 to 30 parts by mass of the component (B) relative to 100 parts by mass of the component (A).

3. The photocurable composition according to claim 1, comprising 100 to 200 parts by mass of the component (C) relative to 100 parts by mass of the component (A).

4. The photocurable composition according to claim 1, wherein the component (A) contains a polyisobutylene having an aromatic hydrocarbon group in its molecule.

5. The photocurable composition according to claim 1, wherein the component (C) contains a (meth)acrylate monomer having a structure of the following formula (C-1):

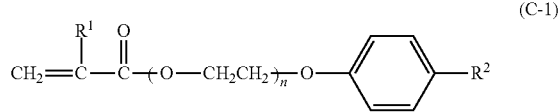

(C-1)

wherein R$^1$ represents a hydrogen or a methyl group, R$^2$ represents a hydrocarbon group having 1 to 20 carbon atoms, and n represents an integer of 0 to 10.

6. The photocurable composition according to claim 1, further comprising a filler as component (E), wherein the photocurable composition comprises 0.1 to 50 parts by mass of the component (E) relative to 100 parts by mass of the component (A).

7. The photocurable composition according to claim 1, wherein the component (B) is a urethane-modified (meth) acrylate oligomer not containing a rubber skeleton.

8. A sealing agent comprising the photocurable composition according to claim 1.

9. A hard disk drive comprising the sealing agent according to claim 8.

10. A cured product obtained by curing the photocurable composition according to claim 1 by light irradiation.

11. The photocurable composition according to claim 1, wherein the component (C) contains isononyl (meth)acrylate.

12. The photocurable composition according to claim 1, wherein the component (B) has a weight average molecular weight in a range from more than 1,000 to 200,000 or less.

* * * * *